United States Patent [19]

Madonia et al.

[11] Patent Number: 4,546,022
[45] Date of Patent: Oct. 8, 1985

[54] COMPOSITE MOLDING SYSTEM

[76] Inventors: Ciro Madonia, 147 Mississauga Rd. North, Mississauga, Ontario; Christopher Hatzikelis, R.R. #2, Palgrave, Ontario; Cesare C. Cosentino, 45 Grandview Ave., Thornhill, Ontario, all of Canada

[21] Appl. No.: 563,650

[22] Filed: Dec. 20, 1983
(Under 37 CFR 1.47)

Related U.S. Application Data

[63] Continuation of Ser. No. 294,403, Aug. 19, 1981, abandoned.

[51] Int. Cl.⁴ .............................................. B60R 13/04
[52] U.S. Cl. .................................... 428/31; 52/716; 293/1; 428/40; 428/903.3
[58] Field of Search ........................ 428/31, 40, 903.3; 52/716; 293/1

[56] References Cited

U.S. PATENT DOCUMENTS

| | | | |
|---|---|---|---|
| 2,987,103 | 6/1961 | Yakubik | 428/47 X |
| 3,400,040 | 9/1968 | Osgood | 428/347 X |
| 3,419,458 | 12/1968 | Brooks et al. | 428/163 |
| 3,472,546 | 10/1969 | Samuels | 428/31 X |
| 3,687,502 | 8/1972 | Loew | 428/31 X |
| 3,745,056 | 7/1973 | Jackson | 428/31 X |
| 3,889,037 | 6/1975 | Vandenberg | 428/31 X |
| 3,922,460 | 11/1975 | Jackson | 428/122 X |
| 4,220,681 | 9/1980 | Narita | 428/31 |
| 4,277,526 | 7/1981 | Jackson | 428/31 |
| 4,296,155 | 10/1981 | Madonia et al. | 428/31 |
| 4,349,592 | 9/1982 | Nussbaum | 428/31 |
| 4,358,489 | 11/1982 | Green | 428/31 |
| 4,493,806 | 1/1985 | Hatzikelis et al. | 264/28 |

*Primary Examiner*—Henry F. Epstein
*Attorney, Agent, or Firm*—Douglas Eggins

[57] ABSTRACT

An elongated decorative molding suitable for use with automotive vehicles has a core portion of reduced density and an outer portion of solid material such as a laminate secured thereto, to provide a finished colored surface of enhanced appearance and durability. The uses of a softer core material such as foamed soft polyvinyl chloride reduces the mass of plastic required by a significant amount, and modifies the flexibility and impact characteristics favorably, while the use of a skin layer such as a thin lamina secured thereto permits the core material to be non-pigmented, for significant savings.

19 Claims, 3 Drawing Figures

COMPOSITE MOLDING SYSTEM

This application is a continuation of application Ser. No. 294,403, filed Aug. 19, 1981, now abandoned.

BACKGROUND OF THE INVENTION

This invention is directed to a decorative molding trim, and in particular to an extruded plastic molding of composite construction having a foamed interior of reduced density.

Widespread use is made in the automotive industry of decorative and protective trims, using flexible plastic extrusion having decorative colours embodied therein, the plastic in use being oil based, such as polyvinyl chloride (PVC).

SUMMARY OF THE INVENTION

It has been found that a superior continuous decorative molding is obtained in the combination of a foamed base extruded from a blown soft plastic such as soft PVC, or reclaimed plastic possessing inherently reduced density, combined with a surface finsh layer, at least on the working surface of the molding to provide a unitary molding having an imperforate section. The improved system affords a saving in the material content of the base in the range of 25 to 40% by weight, due to the cellular structure provided in the extruded base.

Owing to the potential thinness of the molding outer layer, which may be either co-extruded with the foamed base, using a non-blown PVC or other suitable plastic or may be a calendered cover layer or sheet of polymeric formulation having thickness generally in the range of 6 to 12 mils, which is applied to the hot extruded base, the quantity of the colouring pigmentation may be enormously reduced. Thus, by making possible the use of a sheet both to provide a finished surface and the application of colour to the molding, as much as about 95% saving in pigmentation costs is made possible. In the case of metallic finishes this is particularly significant in terms of cost savings.

The use of a pre-formed cover layer in combination with the foamed base yields additional, unobvious advantages in that the calendering process by which the laminate is made permits perfect patterning over the whole face of the laminate. Thus, with the cover layer applied to the foamed base, there is complete uniformity of finish, even on the curved portions of the molding. In the case of prior art finishing of extruded moldings having a patterned finish embossed over a curved surface of the section, difficulties were experienced in achieving the desired standard of finish uniformly over the section, whose curved side surfaces were not always satisfactorily embossed. These difficulties are overcome by the use of preformed finishes, in practicing the present invention.

It will be understood that the unitary composite molding thus produced, having a foamed base of imperforate cross section with a surface finish layer bonded thereto may be suitably protected in well known fashion by the application thereover of protective coatings and layers such as these applied to resist ultra violet degradation.

In addition to the foregoing cost and product advantages, the molding according to the present invention is possessed of greater flexibility, and in the case of certain applications at least, such as protective side molding, has a greater impact cushioning capability than the previous "solid" moldings. In particular the subject invention particularly lends itself in utilizing reclaimed plastic possessing inherent low density, and colour residues that do not posses eye appeal and are not easily re-coloured. The invention further lends itself to production in continuous lengths for bulk packaging and dispensing.

In practicing the invention recycled plastic obtained by way of our process "Recycling of Contaminated Plastic", application Ser. No. 268,385 filed May 29, 1981 now U.S. Pat. No. 4,493,806 is suitable for the base, due to an inherent reduced density. It is generally inherently coloured, being considered as non-coloured unless specific steps are taken to add colour thereto.

BRIEF DESCRIPTION OF THE DRAWINGS

Certain embodiments are described, reference being made to the accompanying drawings, wherein.

DETAILED DESCRIPTION OF PREFERRED EMBODIMENTS OF THE INVENTION

Figure 1:
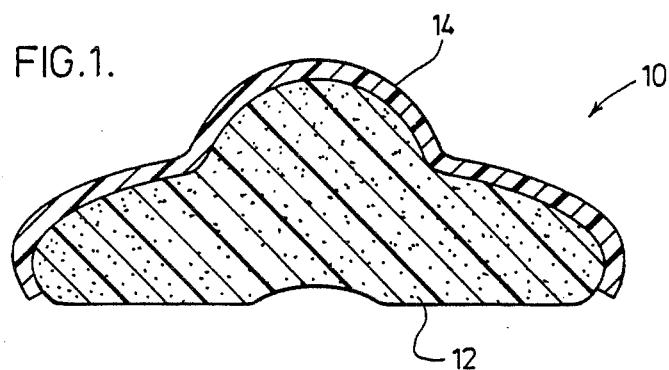
FIG. 1 is a cross-sectional view of molding according to the present invention, incorporating a thin layer surface finish.

Referring to FIG. 1, the illustrated molding 10 has a base portion 12 of extruded foamed plastic with a thin outer covering 14 adhered thereto, comprising a single layer. In the case of soft PVC the extrudate is generally blown to a foamed state.

Figure 2:
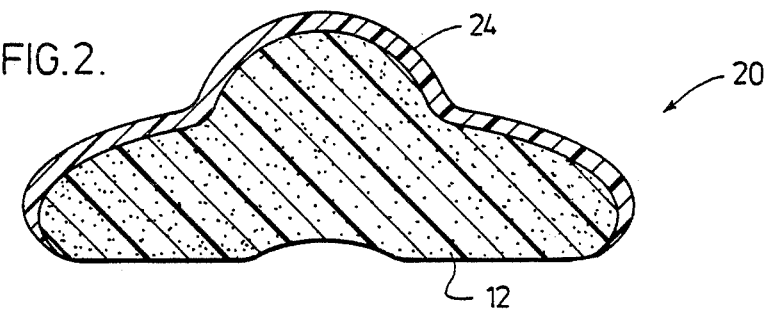
FIG. 2 is a similar view of a molding having an extruded outer layer.

In the FIG. 2 embodiment the molding section 20 has a base portion 12 of extruded foamed plastic, combined with an extruded skin 24 being of a suitable "solid" (i.e. non-blown) plastic such as PVC. The term "foamed" as used herein refers to reclaimed plastic and to blown plastic.

The outer covering is applied to the hot base portion at or adjacent to the point of extrusion, to provide good adhesion to form a unitary imperforate section. In the case if the FIG. 2 embodiment a co-extrusion simultaneously with the base 12 would generally be used.

Figure 3:
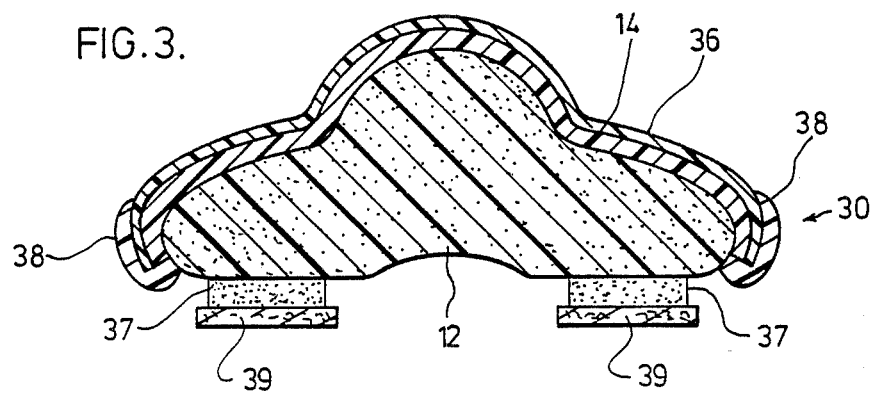
FIG. 3 is a similar view to the FIG. 1 embodiment having protective layers and adhesive attachment strips thereon.

In the FIG. 3 embodiment the complete molding 30 is shown, having a base portion 12 of foamed plastic, a thin outer cover 14, a protective layer 36 to resist ultra violet radiation secured thereover, with protective edge seals 38, which do not form part of the present invention.

In addition, adhesive mounting strips 37 with protective peelable paper overlayers 39 are provided, for applying the molding, in use.

It will understood, in referring to the illustrated section of FIG. 1 that the term "imperforate section" relates to the solidity of the extruded section, as compared to the non-solid "top-hat" section and other forms of hollow section illustrated in U.S. Pat. No. 4,220,681, Narita, issued Sept. 2, 1980. The subject imperforate section is readily extruded in conventional fashion as a continuous length and is well suited for selective dispensing. Owing to the imperforate section, the subject section is substantially undeformed by handling, unlike the various hollow profiles of Narita, which are unsuited to high speed mass production and roll storage and dispensing.

What I claim by Letters Patent of the United States is:

1. An elongated non-metallic continuous decorative impact cushioning molding suited for attachment to the sides of vehicles consisting of:
   (a) an extruded solid base section of pliable foamed plastic material having a predetermined imperforate cross-section of reclaimed plastic possessing colour residues therein, with a curved outer surface and a substantially flat under surface having an adhesive mounting strip attached thereto and;
   (b) a decorative and protective non-blown plastic skin layer portion incorporating decorative pigmentation applied as a preformed thin skin in bonded adherent relation to, and covering the whole of said outer surface of the base section in protective and concealing decorative relation therewith to form a unitary molding.

2. The molding as claimed in claim 1 said skin layer portion having a protective coating thereover to resist ultra violet degradation.

3. The molding as claimed in claim 1, said skin layer portion comprising an extruded portion.

4. The molding as claimed in claim 1 wherein said base is of non-coloured foamed plastic, said skin layer portion being coloured.

5. The molding as claimed in claim 1, said base being of soft blown plastic.

6. The molding as claimed in claim 1, said base being extruded from reclaimed plastic possessing inherent reduced density.

7. The molding as claimed in claim 1 including at least one protective layer overlying said skin layer portion.

8. The molding as claimed in claim 7, said base being of soft blown plastic.

9. The molding as claimed in claim 7 said base being extruded from reclaimed plastic possessing inherent reduced density.

10. The molding as claimed in claim 2 said skin layer portion including a protective layer to resist ultra violet degradation.

11. The molding as claimed in claim 2, said protective skin being calendered and pigmented therethrough.

12. The molding as claimed in claim 11 said skin being pigmented to provide a desired colour and appearance, having a thickness in the range of 6 to 12 mils.

13. The molding as claimed in claim 2 said skin being of non-blown polyvinyl chloride.

14. The molding as claimed in claim 11 said protective skin being a calendered pigmented laminate.

15. The molding as claimed in claim 13 said skin being pigmented to provide a desired colour and appearance, having a thickness in the range of 6 to 12 mils.

16. The molding as claimed in claim 2 said skin being coloured by a metallic pigment.

17. The molding as claimed in claim 5 said foamed plastic comprising blown polyvinyl chloride.

18. The molding as claimed in claim 3 said skin layer portion comprising an extruded portion.

19. The molding as claimed in claim 2 said foamed plastic base having a density in the range of about 60 to 75% that of non-foamed plastic.

* * * * *